United States Patent [19]

Kobo et al.

[11] Patent Number: 4,896,213

[45] Date of Patent: Jan. 23, 1990

[54] GHOST CANCELLING REFERENCE SIGNAL TRANSMISSION/RECEPTION SYSTEM

[75] Inventors: Kazuo Kobo, Neyagawa; Kiyotake Fukui, Settsu; Toshiro Nozoe, Ibaraki; Noriaki Morotomi, Fujisawa, all of Japan

[73] Assignee: Matsushita Electric Industrial Co., Ltd., Osaka, Japan

[21] Appl. No.: 885,825

[22] Filed: Jul. 15, 1986

[30] Foreign Application Priority Data

Jul. 16, 1985 [JP] Japan ................................ 60-156458
Nov. 11, 1985 [JP] Japan ................................ 60-252152

[51] Int. Cl.$^4$ ............................................. H04N 7/087

[52] U.S. Cl. .................................... 358/147; 358/167; 358/905

[58] Field of Search ............... 358/147, 146, 160, 167, 358/905; 375/13, 14; 333/18; 379/410

[56] References Cited

U.S. PATENT DOCUMENTS

| | | | |
|---|---|---|---|
| 2,236,134 | 3/1941 | Gloess . | |
| 3,996,419 | 12/1976 | Kennedy . | |
| 4,047,013 | 9/1977 | Milewski | 375/13 |
| 4,176,317 | 11/1979 | Manfreda . | |
| 4,303,895 | 12/1981 | Ohniski et al. | 358/905 |
| 4,321,686 | 3/1982 | Horna | 379/410 |
| 4,367,489 | 1/1983 | Holmes . | |
| 4,435,823 | 3/1984 | Davis et al. | 375/14 |
| 4,459,613 | 7/1984 | Faroudja . | |

FOREIGN PATENT DOCUMENTS

| | | | |
|---|---|---|---|
| 1370535 | 10/1974 | United Kingdom | 358/147 |

OTHER PUBLICATIONS

"Automatic Cancellation System for Multiple TV Ghosts", by S. Onishi and M. Obara, NHK Technical Report, vol. 21, pp. 187–191.

"Ghost Cancel Reference Signal" by M. Obara et al., Technical Report of the Institute of Television Engineers of Japan RE81-6, Feb. 1981, pp. 33–38.

"A Study of Reference Signal for Transversal-type Ghost Canceller" by M. Obara, Transactions of the Institute of Electronics and Communication Engineers of Japan, vol. J68-B, No. 12, Dec. 1985, pp. 1381–1389.

IEEE Transactions on Consumer Electronics, "Ghost Clean System", by Junzo Murakami et al., Toshiba Corporation, vol. CE-29, No. 3, Aug. 1983, pp. 129–134.

Ciciora et al., "A Tutorial on Ghost Cancelling in Television Systems", IEEE Transactions on Consumer Electronics, vol. CE-25, 2/79, pp. 9–43.

Kegel, "Multi-scribosony" Delft Progress Report Series B, vol. 1, No. 2, pp. 36–38, 7/75.

Thedick, "Adaptive Multipath Equalization for T.V. Broadcasting" IEEE Transactions on Consumer Electronics, vol. CE-23, No. 2, 5/77, pp. 175–181.

Hiroshima et al., "Teletext Receiver" IEEE Transactions on Consumer Electronics, vol. CE-26, No. 3, 8/80, pp. 657–663.

*Primary Examiner*—James J. Groody
*Assistant Examiner*—David E. Harvey
*Attorney, Agent, or Firm*—Wenderoth, Lind & Ponack

[57] ABSTRACT

A ghost cancelling reference signal transmission/reception system, which allows a built-in ghost cancelling device to eliminate group-delay distortion, frequency-amplitude characteristic distortion, ghost components generated in a signal transmission path. A digital signal is superposed on a television signal in a vertical blanking period of the television signal as a ghost cancelling reference signal.

6 Claims, 8 Drawing Sheets

TELEVISION SIGNAL
SIGNAL SUPERPOSITION CIRCUIT
12
FIRST GHOST CANCELLING REFERENCE SIGNAL GENERATION CIRCUIT
25
SWITCHING CONTROL CIRCUIT
27
SECOND GHOST CANCELLING REFERENCE SIGNAL GENERATION CIRCUIT
26
15

70
8
9
9
ONE HORIZONTAL PERIOD 80
8
9
9
ONE HORIZONTAL PERIOD

GHOST CANCELLING REFERENCE SIGNAL TRANSMISSION/RECEPTION SYSTEM

BACKGROUND OF THE INVENTION

1. Field of the Invention

The present invention relates to a ghost cancelling reference signal transmission/reception system for transmitting and receiving a ghost cancelling reference signal which is superposed on vertical blanking intervals of a television signal.

2. Description of Prior Arts

Conventionally, a ghost cancelling device incorporating a transversal filter is known as an effective means for cancelling ghost generated in a transmission path of television signals. This device cancels ghost by causing the transversal filter to have a filter characteristic inverse to that of the signal transmission path generating the ghost under the assumption that the signal transmission path functions as a "pseudo-filter". The device determines the filter characteristic of the signal transmission path by using a specific reference signal. Typically, a differential signal of the leading edge of a vertical synchronizing signal is used as this reference signal as shown in "Automatic Cancellation System for Multiple TV Ghosts", by S. Onishi and M. Obara, NHK Technical Report, VOL. 21, PP187–191.

Referring now to FIGS. 1(*a*) and 2(*b*), the above reference signal will be described. In FIG. 1(*a*), reference numeral 1 denotes the leading edge of a vertical synchronizing signal, reference numeral 2 denotes a ghost, and reference numeral 3 denotes a vertical equalizing pulse. The ghost 2 is a delayed component of the leading edge 1 of the vertical synchronizing signal. FIG. 1(*b*) shows signal waveforms generated by differentiating the leading edge 1 of the vertical synchronizing signal and the ghost component 2. In FIG. 1(*b*), reference numeral 4 denotes the differential signal of the leading edge 1 of the vertical synchronizing signal, and reference numeral 5 denotes the differential signal of the ghost component 2. These differential signals 4 and 5 indicate an impulse response of the signal transmission path. Ghost can be cancelled by using this impulse response.

In addition, NHK (Nippon Housou Kyokai or Japan Broadcast Corporation) also proposes another art of cancelling ghost using a specific reference signal called GCR (Ghost Cancel Reference), as shown in "Ghost Cancel Reference Signal" by M. Obara et al., Technical Report of the Institute of Television Engineers of Japan, RE81-6, February, 1981, pp. 33–38. The proposed art is represented in FIG. 2, in which reference numeral 6 denotes a bar signal, 7 a pulse signal, 8 a color burst signal and 9 a horizontal synchronizing signal. The pulse signal 7 is used for presuming the impulse response of the signal transmission path, and the bar signal 6 is used for detecting an occurrence of a sag generated by the transversal filter.

However, use of the vertical synchronizing signal for making up the conventional ghost cancelling reference signal still involves some problems to be solved. First, quality of synchronizing signal of the actual television broadcasting signal is not guaranteed quantitatively. The synchronizing signal part of television signal modulated into RF signal contains the largest amount of power and is vulnerable to non-linear distortion. Consequently, the relationship between waveform distortions of video and synchronizing signals due to ghost is not fixed, and therefore, it is difficult for the system using the leading edge of vertical synchronizing signal for making the ghost cancelling reference signal to totally eliminate the ghost.

Likewise, the GCR proposed by NHK, in order to securely eliminate the ghost, requires the pulse signal 7 to have a specific pulse width as small as about 1.5 T (a half-value width of 187.5 μsec.) (T : sampling period). This is expressly stated in "A Study of Reference Signal for Transversal-Type Ghost Canceller" by M. Obara, Transactions of the Institute of Electronics and Communication Engineers of Japan, VOL. J68-B No. 12, December, 1985, pp. 1381–1389. Nevertheless, with the pulse signal mentioned above, information needed for compensating for close-ghost, group-delay distortion, distortion of frequency amplitude characteristic and the like that raise critical problems in the teletext system cannot easily be obtained. This is because the impulse response of the distortion in the signal transmission path appears as the collective pulse present near the original pulse, thus making it difficult for the system to separate these pulses from the original pulse.

In addition, since the pulse signal is a single pulse, its signal power is very small and thus adversely affected by a noise.

Further, in the system using the leading edge of vertical synchronizing signal as the reference signal, the system cannot correctly identify whether the delayed signal is caused by the reference signal or by another signal when the ghost delayed by more than ($\frac{1}{2}$)H (H : horizontal scanning period) exists. This will be explained with reference to FIGS. 3(*a*) and 3(*b*). FIG. 3(*a*) is a signal waveform showing that a ghost is delayed by more than ($\frac{1}{2}$)H. In FIG. 3(*a*), reference numeral 1 denotes the leading edge of a vertical synchronizing signal, 3 denotes an equalizing pulse, and 10 denotes a ghost which is a more than ($\frac{1}{2}$)H delayed equalizing pulse 3. In FIG. 3(*b*), reference numeral 4 denotes a differential signal of the leading edge 1 of the vertical synchronizing signal, and reference numeral 11 denotes differential signals of the ghost 10. It cannot be identified from FIGS. 3(*a*) and 3(*b*) whether the ghost 10 is derived from the equalizing pulse 3 or the leading edge 1 of the vertical synchronizing signal.

Accordingly, ghost cancellable range is ($\frac{1}{2}$)H when the leading edge of the vertical synchronizing signal is used as the reference signal. Likewise, due to the same reason as above, a ghost having a delay time more than 16.8 μsec. cannot be cancelled even when the GCR proposed by NHK is used.

SUMMARY OF THE INVENTION

An object of the present invention is to eliminate group-delay distortion, frequency-amplitude characteristic distortion, ghost and the like from the television signal transmission system and at the same time allow the system to securely transmit digital data signal.

In order to achieve this object, the present invention provides a ghost cancelling reference signal transmission/reception system comprising: means for generating a digital signal; means for superposing the digital signal on a television signal in a vertical blanking interval; means for transmitting the television signal containing the superposed digital signal; and ghost-cancelling means for cancelling group-delay distortion, frequency-amplitude characteristic distortion, ghost and the like generated in the television signal transmission means from the television signal transmitted through the transmission means. The digital signal is a train of pulses which preferably has a randomness.

The present invention will be better understood from the detailed description given hereinbelow with the accompanying drawings in which:

DESCRIPTION OF THE PREFERRED EMBODIMENT

Figure 1A:
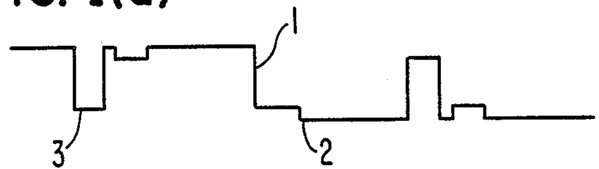
FIGS. 1(*a*) and 1(*b*) are waveform charts illustrating a relationship between the leading edge of a vertical synchronizing signal and a ghost.
Figure 1B:
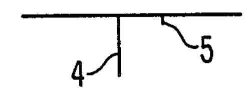
Figure 2:
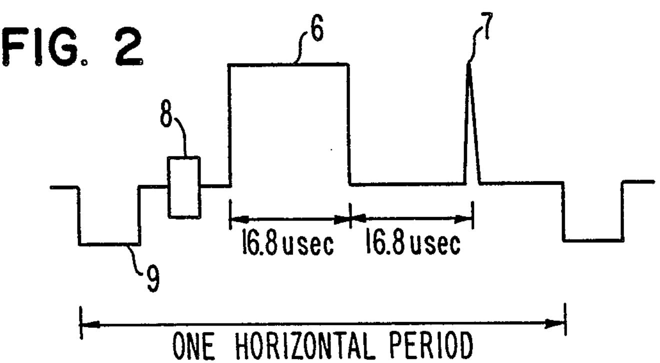
FIG. 2 is a waveform chart showing a conventional ghost cancelling reference signal.
Figure 3A:
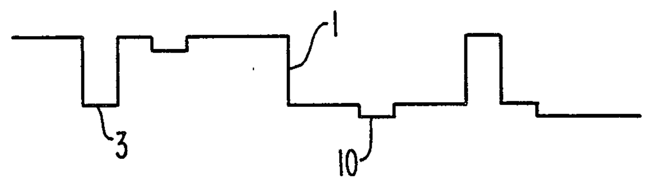
FIGS. 3(*a*) and 3(*b*) are waveform charts illustrating a relationship between the leading edge of a vertical synchronizing signal and a ghost which has a delay time of more than (½)H.
Figure 3B:
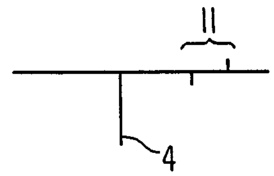
Figure 4:
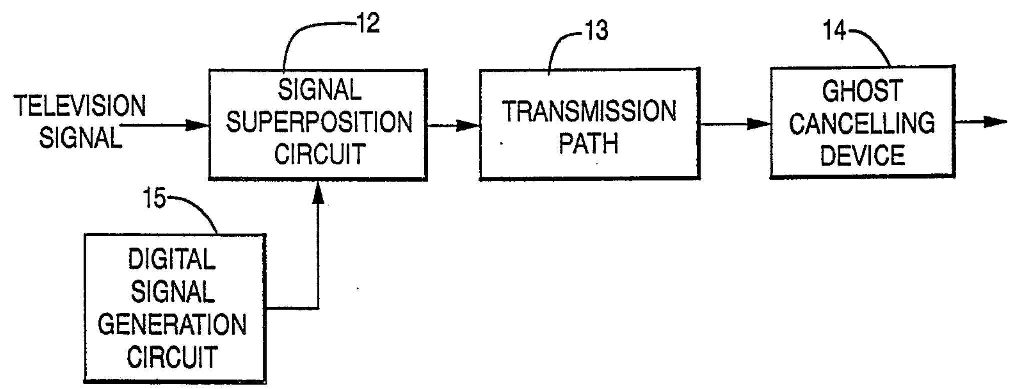
FIG. 4 is a block diagram showing ghost cancelling reference signal transmission/reception system reflecting a preferred embodiment of the present invention.

FIG. 4 shows an embodiment of the ghost cancelling reference signal transmission/reception system of the invention. A digital signal generation circuit 15 generates a digital signal composed of a train of pulses. The digital signal may be either a coded signal or a random signal. The digital signal is used as a ghost cancelling reference signal. A signal superposition circuit 12 superposes the digital signal from the digital signal generation circuit 15 on a television signal in a vertical blanking period. The digital signal superposed television signal is transmitted through a transmission path 13. A ghost cancelling device 14 refers to the digital signal as a reference signal and eliminates group delay distortion, frequency-amplitude characteristic distortion and ghost which are generated in the transmission path 13. The transmission path 13 may be either a system which modulates a carrier signal with the television signal and transmits the modulated carrier signal through a radio wave or a wire or cable or a system which records the television signal on a recording medium and reproduces the recorded signal.

Figure 5:
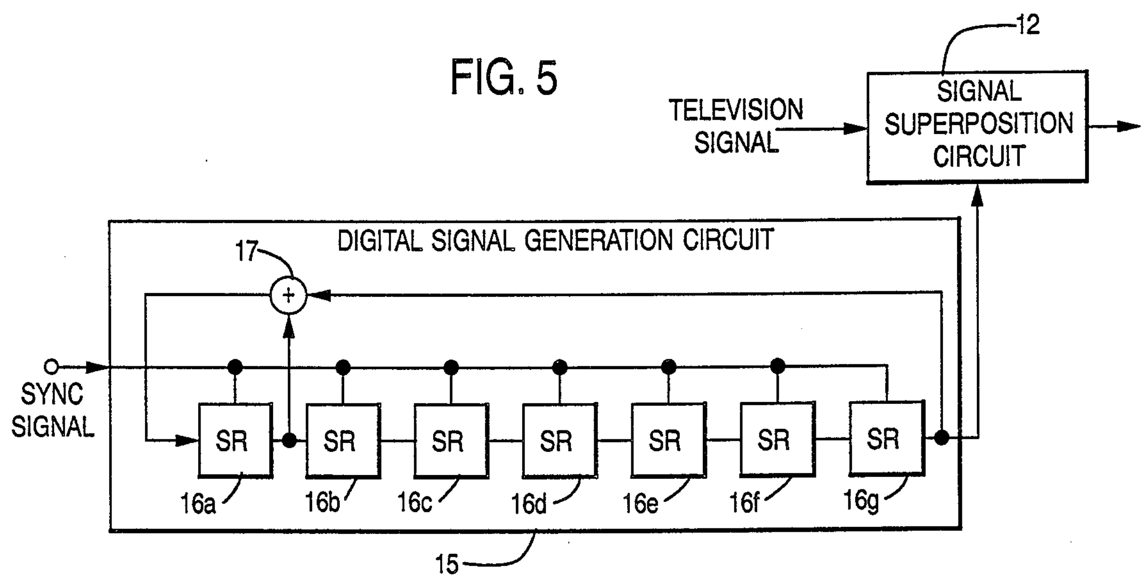
FIG. 5 is a block diagram showing an example of digital signal generation circuit.

FIG. 5 shows an example of the digital signal generation circuit 15. The circuit 15 in FIG. 5 is a known 127-bit length M-series random signal generation circuit, which comprises shift registers (SRs) **16*a*–16*g* and an adder 17. Pulses output from the shift registers 16*a* and 16*g* are added by the adder 17, and then fed back to the shift register 16*a* to thereby cause the shift register 16*g*** to output a pseudo random signal as the digital signal.

The generated digital signal is then delivered to the signal superposition circuit 12, which then superposes the digital signal on the television signal in a vertical blanking period of the television signal. The reason for employing the random signal as the digital signal is to make the signal spectrum as flat as possible within the transmission band and also to remove the periodicity of the signal as much as possible.

Figure 6:
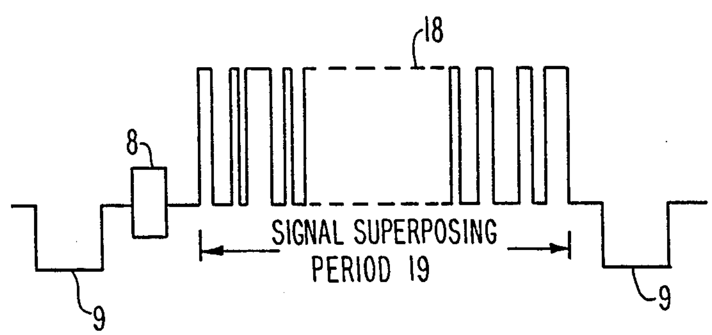
FIG. 6 is a waveform chart showing an example of digital signal superposed on a horizontal period.

FIG. 6 shows an example of waveform of the ghost cancelling reference signal which is superposed on a television signal in a horizontal period in a vertical blanking period of the television signal. In FIG. 6, reference numeral 18 denotes a digital signal or the ghost cancelling reference signal, 19 denotes a period of superposing the reference signal, 8 denotes a color burst signal and 9 denotes horizontal synchronizing signal. In this example, the digital signal 18 is superposed as a binary NRZ signal in the superposing period 19 in which no vertical synchronizing signal and no vertical equalizing pulse are present. The random signal generation circuit is not limited to the circuit in FIG. 5, but other various known random signal generators can be used.

Next, another example of the digital-signal generation circuit 15 will be described with reference to FIG. 7. This example generates a digital signal containing data while maintaining its randomness.

Figure 7:
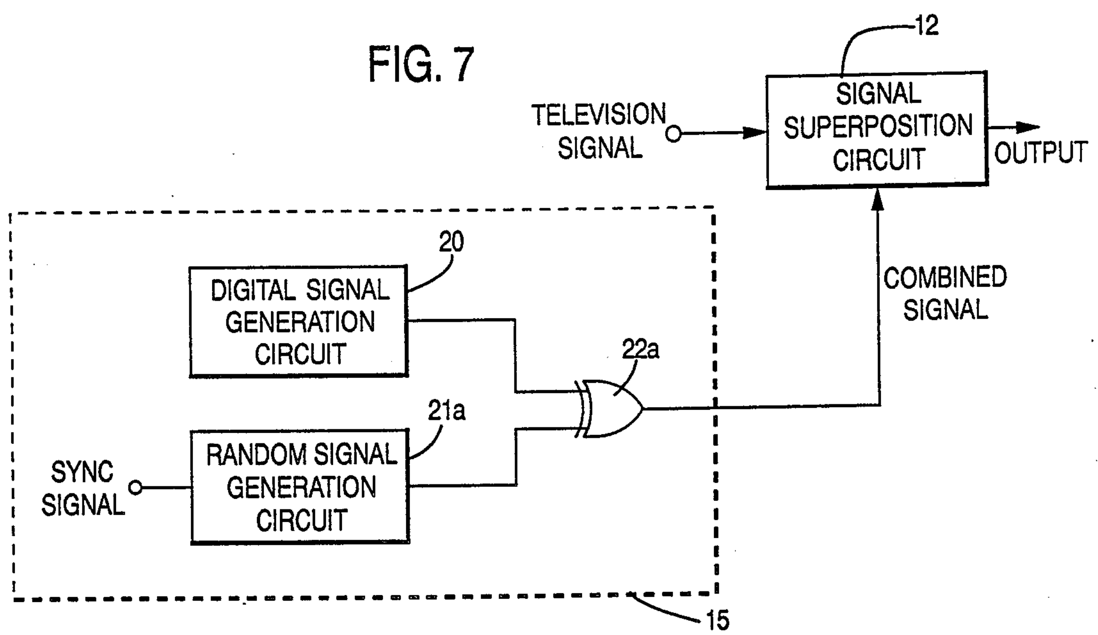
FIG. 7 is a block diagram showing another example of digital signal generation circuit.

In FIG. 7, a data signal generation circuit 20 generates a data signal, and a random signal generation circuit **2*a* generates a random signal. The signals outputted from the data signal generation circuit 20 and the random signal generation circuit 21*a* are combined by an exclusive OR circuit 22*a*. The combined signal is then superposed as a ghost cancelling reference signal on a television signal by the signal superposition circuit 12. The circuit in FIG. 7 can be effectively applied to such a new television system that superposes a specific information on a television signal. Control data required for a television receiver to extract the specific information can be generated by the data signal generation circuit 20 and superposed on the television signal with the circuit in FIG. 7**.

For example, such a system is under development that superposes a high definition signal on a television signal. In this system, a control signal is required for a television receiver to reproduce the high definition signal. The control signal can be superposed on the television signal with the circuit in FIG. 7 by designing the data signal generation circuit 20 so as to generate the control signal. For another example, such a system is under development that scrambles a television signal at a transmitter and descrambles the scrambled television signal at a receiver. In this system also, a control signal for controlling the receiver can be superposed on the television signal by using the circuit in FIG. 7 at the transmitter.

In any application, the data signal generation circuit 20 can be easily realized by known digital circuit or microcomputer techniques in a variety of manners.

Figure 8:
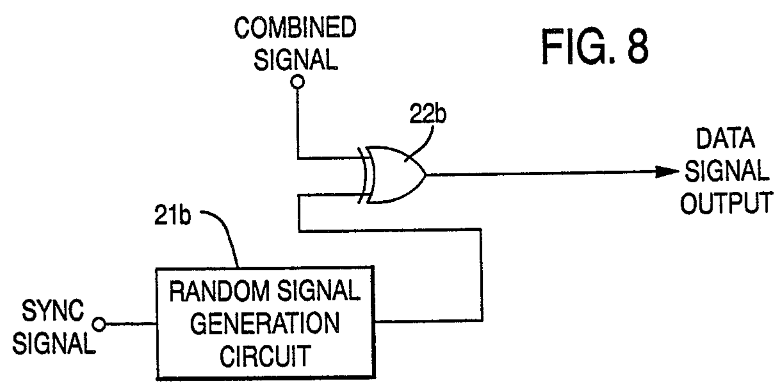
FIG. 8 is a block diagram showing an example of data signal extraction circuit.

FIG. 8 shows a data extraction circuit for extracting the data signal from the combined signal containing the data signal and random signal in a television receiver.

The combined signal is extracted from the received television signal. A random signal generation circuit **21*b* generates the same random signal as that generated by the random signal generation circuit 21*a*. The extracted combined signal and the random signal are applied to an exclusive OR circuit 22*b*, whereby at the output of the exclusive OR circuit 22*b*** is obtained only the data signal.

Figure 9:
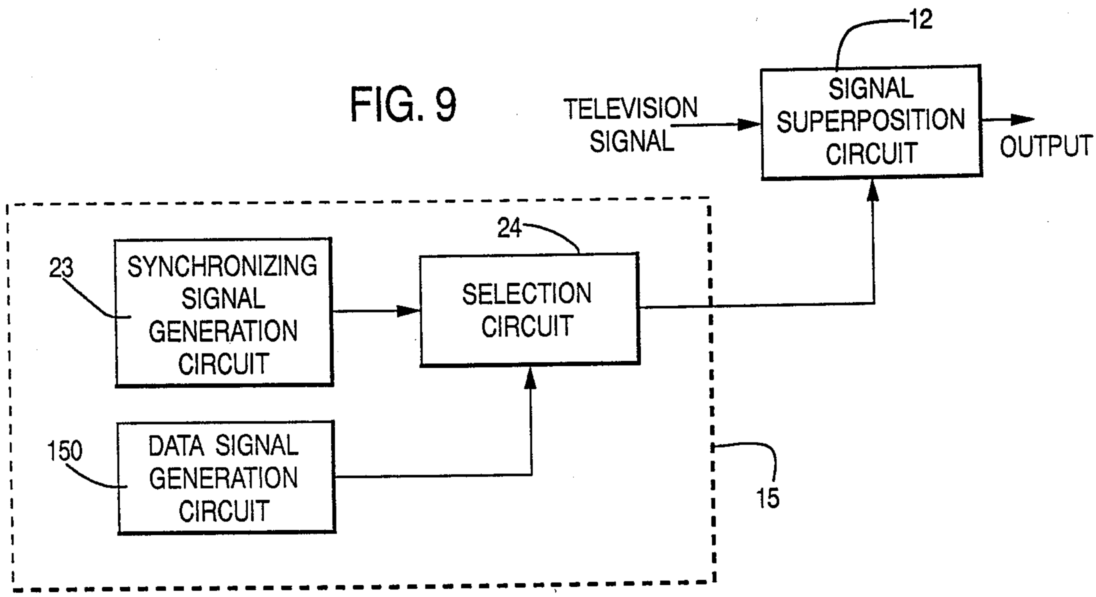
FIGS. 9 and 10 are block diagrams respectively showing other examples of digital signal generation circuit.

FIG. 9 shows still another example of the digital signal generation circuit 15 which generates a digital signal containing frame synchronizing signals, clock synchronizing signals and data signals following the synchronizing signals, as a ghost cancelling reference signal. A synchronizing signal generation circuit 23 generates the frame synchronizing signals and the clock synchronizing signals. A data signal generation circuit 150 generates digital data signals. A selection circuit 24 selectively passes output signals from the synchronizing signal generation circuit 23 and the data signal generation circuit 150 so as to produce a digital signal having a header part containing the frame synchronizing signals and the clock synchronizing signals, and a data part containing the data signals. The digital signal is superposed as a ghost cancelling reference signal on a television signal by the signal superposition circuit 12. The circuit in FIG. 9 can be applied to such a system that transmits digital data signals by superposing them on the television signal, such as the teletext system.

Figure 10:
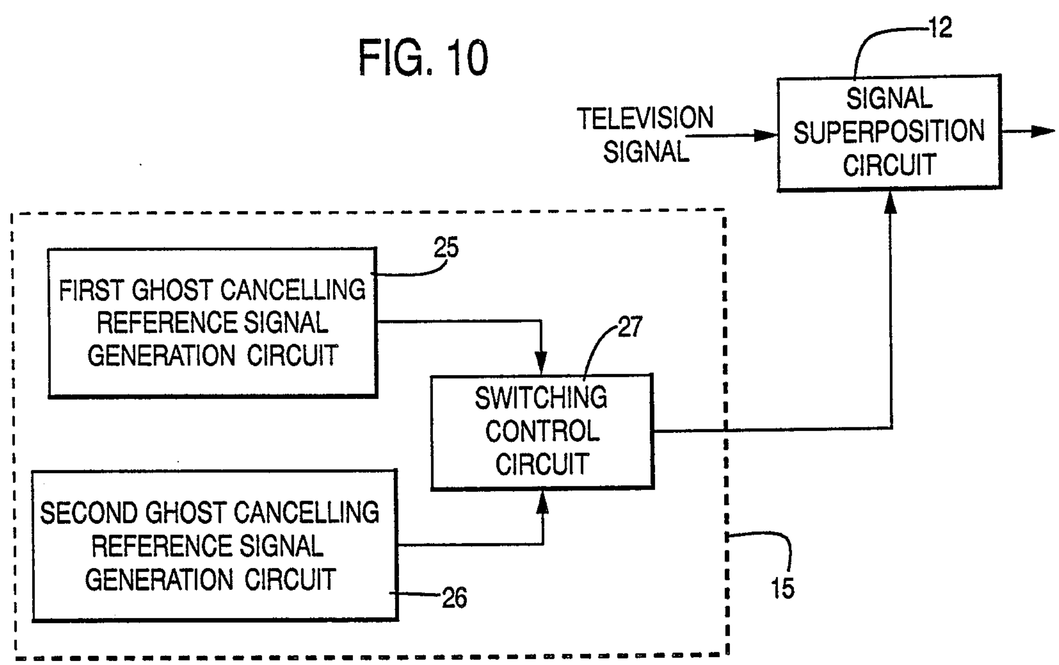
Figure 11:
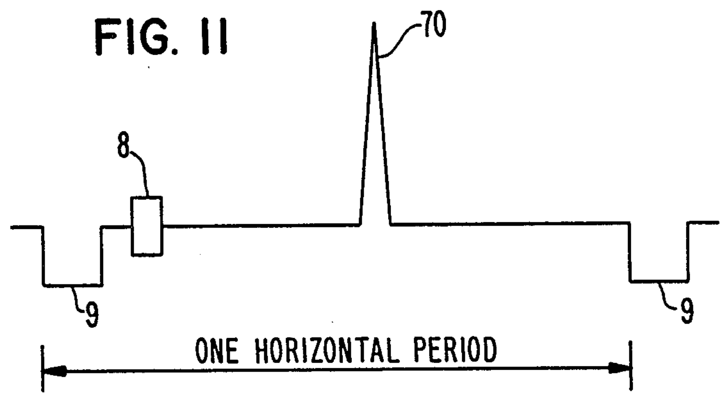
FIG. 11 is a waveform chart showing a pulse signal superposed on a horizontal period.
Figure 12:
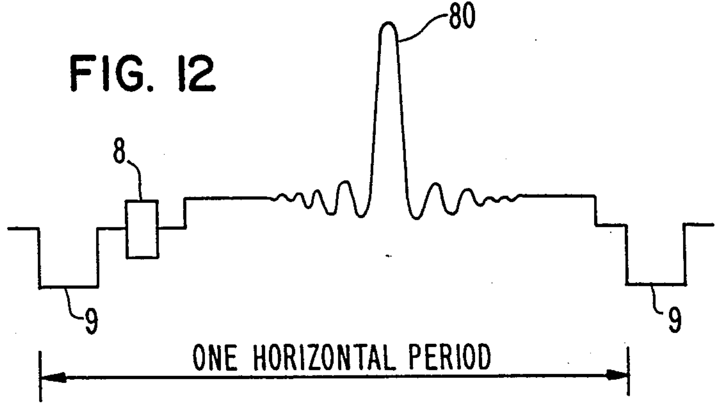
FIG. 12 is a waveform chart showing a SINX/X signal superposed on a horizontal period.
Figure 13:
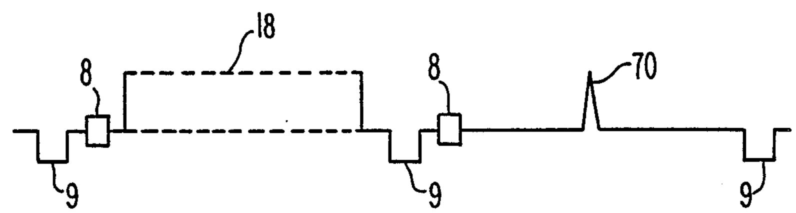
FIG. 13 is a waveform chart showing a digital-signal and a pulse signal superposed on two horizontal periods.
Figure 14:
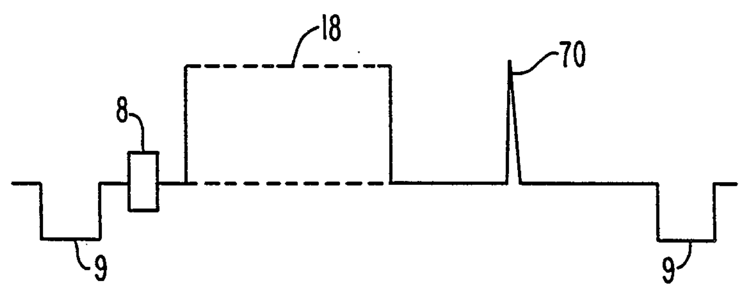
FIG. 14 is a waveform chart showing a digital-signal and a pulse signal superposed on a horizontal period.

FIG. 10 shows yet another example of the digital signal generation circuit 15. In FIG. 10, a first ghost cancelling reference signal generation circuit 25 generates a digital signal, whereas a second ghost cancelling reference signal generation circuit 26 generates either a single pulse signal or a sinX/X signal or a fixed signal which will become a bar signal when modulated for transmission. FIGS. 11 and 12 respectively show waveforms of the signal pules 70 signal and the sinX/X signal 80. A signal switching control circuit 27 alternately selects one of the output signals of the first and second ghost cancelling reference signal generation circuits so that the digital signal and the pulse signal are superposed on a television signal in a way as shown in FIG. 13 or FIG. 14. The digital signal 18 serves as a first ghost cancelling reference signal, and the pulse signal 70 serves as a second ghost cancelling reference signal. FIG. 13 shows a case in which the first and second ghost cancelling reference signals are separately superposed in two horizontal periods of one field. FIG. 14 shows a case in which the first and second ghost cancelling reference signals are superposed in each horizontal period in the vertical blanking period except the periods containing the vertical equalizing pulses and vertical sync pulse.

The first and second ghost cancelling reference signals are switched every field in FIG. 13, and every half field in FIG. 14. But they may be switched every n fields (n : any integer). In other words, the first reference signal is superposed in consecutive n fields, and the second reference signal is superposed in next consecutive n fields.

To effectively eliminate ghost from television signal, throughout the entire video signal band of television signal, the transmission bit rate of the digital signal should desirably be at least twice the video signal band. However, considering the practical hardware constitution, the transmission bit rate may be twice the color sub-carrier frequency.

Next, method of using the superposed digital signal as a ghost cancelling reference signal will be described below.

Figure 15:
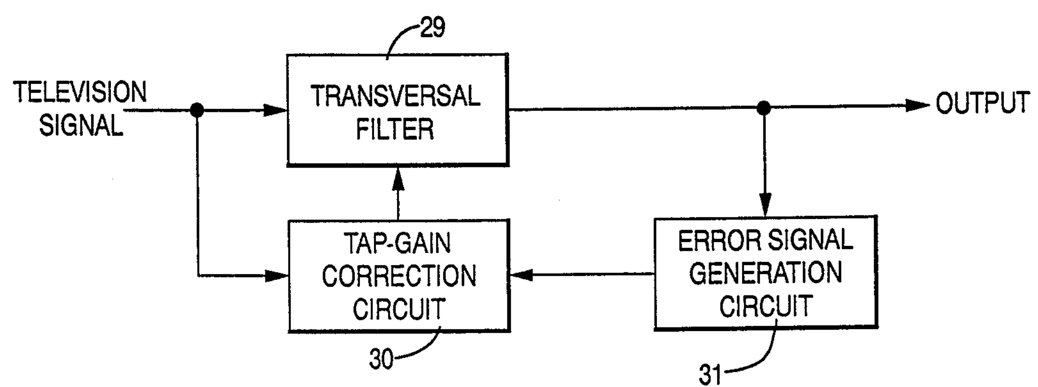
FIG. 15 is a block diagram showing an example of ghost cancelling device.

FIG. 15 shows an example of the ghost cancelling device 14 incorporating a transversal filter. In FIG. 15, reference numeral 29 denotes a transversal filter, 30 denotes a tap-gain correction circuit and 31 denotes an error signal generation circuit. The transversal filter 29 is controlled to have an inverse filter characteristic to the filter characteristic of the transmission path 13 so that the group-delay distortion, frequency-amplitude characteristic distortion and ghost which are produced in the transmission path 13 are eliminated from television signals. Specifically, an output signal from the transversal filter 29 is applied to the error signal generation circuit 31, which then generates an error signal corresponding to a waveform distortion caused by elimination errors of the group-delay distortion, frequency-amplitude characteristic distortion and ghost. The tap-gain correction circuit 30 receives the error-signal and the input television signal, and controls the operation of the transversal filter 29 by applying an algorithm such as the mean-square error method to minimize the error signal, i.e., to eliminate the group-delay distortion, frequency-amplitude characteristic distortion and ghost from the television signal.

The error signal generation circuit 31 extracts the digital signal from the output television signal from the transversal filter 29, and obtains a difference between the level of the extracted digital signal and a desired digital signal level. This difference is outputted as the error signal.

Since the digital signal contain a greater amount of power than that of a single pulse, it is more free from an interference of a noise than the conventional single pulse reference signal.

Further, since the correction amount of the tap weight of the transversal filter 29 is obtained by correlative operation between the error signal and the input signal by using the algorithm such as the mean-square error method, even if any potential error caused by a signal other than the reference signal may be present in the error signal, the system operation can securely eliminate adverse influence of the error. Consequently, ghost components having a delay more than a half horizontal period can be eliminated.

The transversal filter 29 in FIG. 15 may be replaced by any other type of waveform equalizing circuit.

Further, the arrangement in FIG. 15 can be easily configured by well-known techniques. One such example is disclosed in "Ghost Clean System" by J. Murakami et al., IEEE Transactions on Consumer Electronics, VOL. CE-29, No. 3, August 1983, pp. 129–134.

Figure 16:
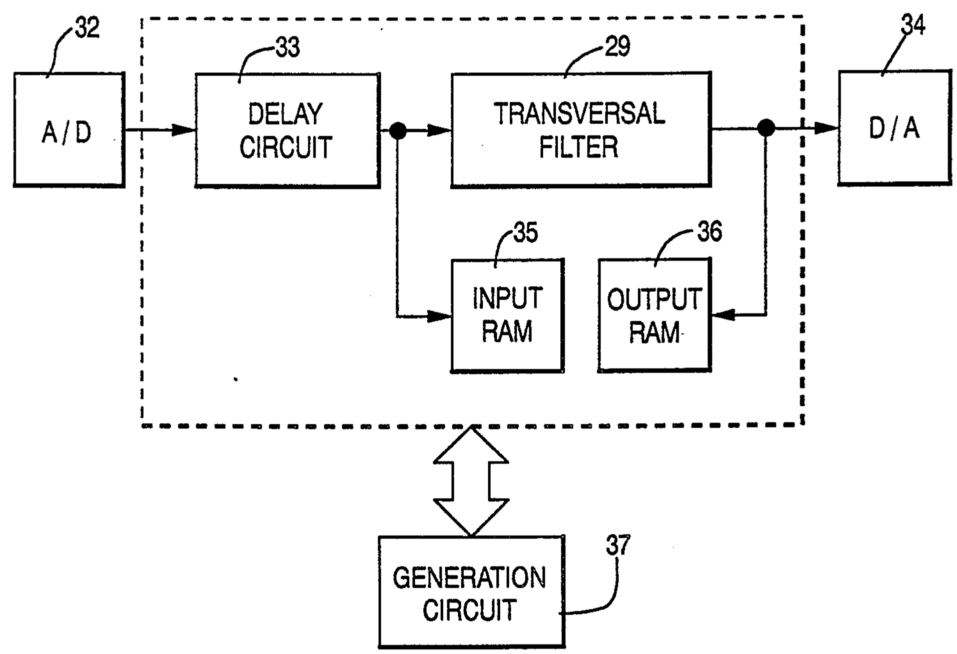
FIG. 16 is a block diagram showing another example of ghost cancelling device.

FIG. 16 shows another example of the ghost cancelling device 14, in which reference numeral 32 denotes an A/D converter, 33 a delay circuit, **34*a* D/A converter, 35 an input RAM, 36 an output RAM and 37 an operation circuit. The A/D converter 32 first quantizes the input television signal. The quantized signal is then delivered to the delay circuit 33 to be delayed by a specific time corresponding to a delay time of a ghost having the largest amplitude. The operation circuit 37 extracts the ghost cancelling reference signals from the television signals inputted to and outputted from the transversal filter 29, respectively, and then executes an correlative operation between the extracted reference signals. Based on the result of the operation, the operation circuit 37 controls the transversal filter 29 so that the filter characteristic thereof becomes inverse to that of the transmission path 13, thereby eliminating the group-delay distortion, frequency-amplitude characteristic distortion and ghost. Provision of the delay circuit 33 before the transversal filter 29** allows to securely eliminate those distortions and ghost having a substantial delay amount without enlarging the size of the transversal filter.

Figure 17:
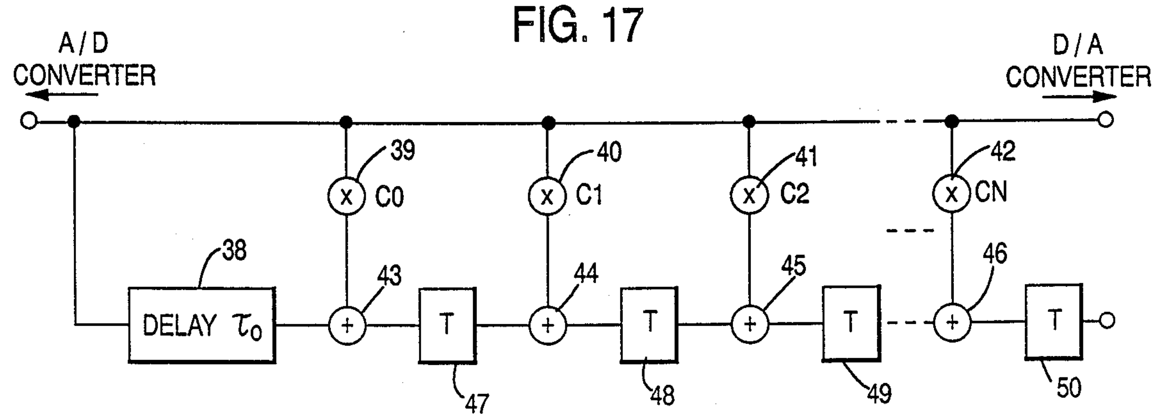
FIG. 17 is a block diagram showing an example of circuit incorporating delay circuit and transversal filter.
Figure 18:
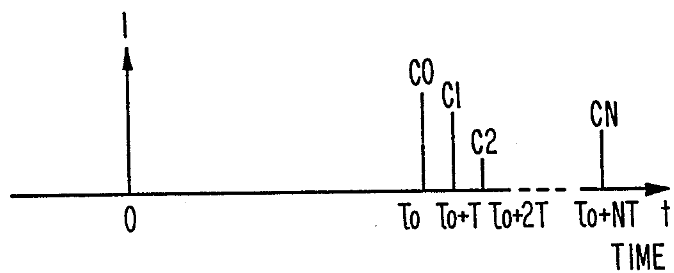
FIG. 18 is a conceptive chart showing tap co-efficients of transversal filter.

FIG. 17 shows another combination of delay circuit and transversal filter of the ghost cancelling device 14, in which reference numeral 38 denotes a delay element having a delay amount $\tau_o$, reference numerals 39 through 42 denote multipliers having coefficients $C_o$ through $C_n$, respectively, reference numerals 43 through 46 denotes adders, and reference numerals 47 through 50 denote delay elements each having a delay amount T. The tap coefficients in this case becomes as shown in FIG. 18, which shows that the system can effectively eliminate a ghost having any amount of delay by varying the delay amount $\tau_o$.

Figure 19:
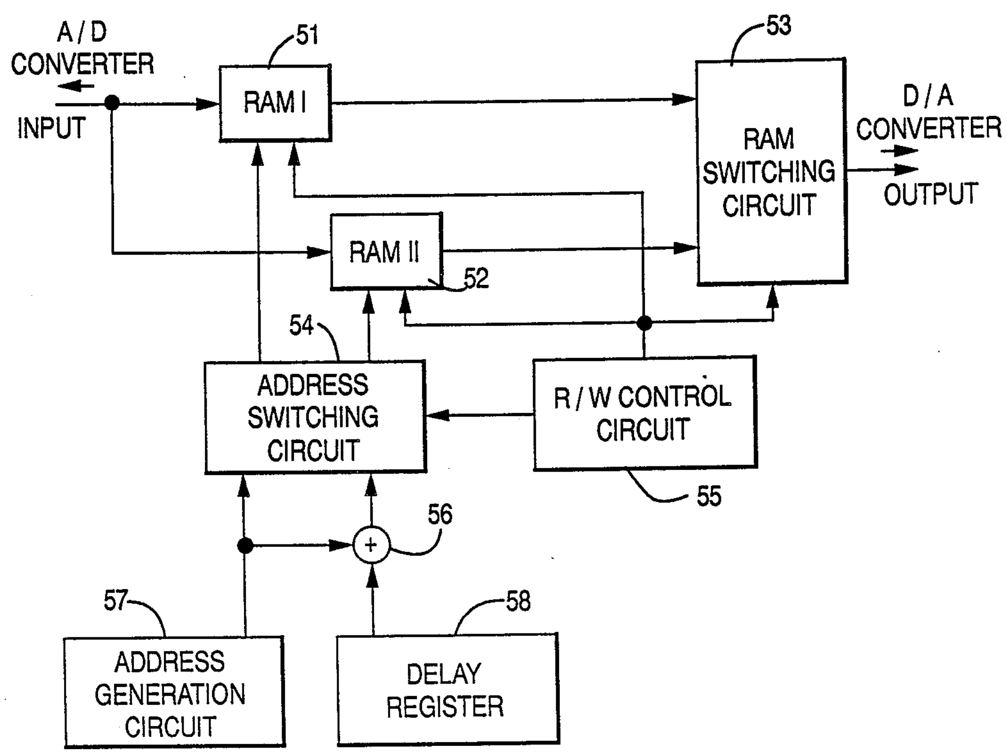
FIG. 19 is a block diagram showing an example of delay circuit.

FIG. 19 shows another example of the delay circuit 33, in which reference numerals 51 and 52 respectively denote first and second RAMs, 53 a RAM switching circuit, 54 an address switching circuit, 55 a read/write control circuit, 57 an address generating circuit, and 58 a delay register. The read/write control circuit 55 alternately switches the writing and reading timings of the first and second RAM 51 and 52. The delay circuit 33 realizes an arbitrary delay amount by causing the written addresses to delay themselves from the reading addresses by a specific value set by the delay register 58.

As is clear from the foregoing description, the present invention provides a variety of advantages described below.

(1) Since the ghost cancelling reference signal is superposed on a television signal in a vertical blanking period, the reference signal and the video signal are transmitted under the same condition, so that the ghost can be securely eliminated at a receiver.

(2) Since the transmission power of the transmission power the ghost cancelling reference signal can be remarkably increased compared to the conventional signal pulse reference signal, the influence of noise interference can be reduced.

(3) Ghost components having delay amounts more than a half horizontal period can be eliminated.

(4) All signals can be digitally processed, thus ideally being suited for introducing a full LSI circuit constitution.

The present invention thus being described, however, it is obvious that the same way may be varied in may ways. Such variation are not regarded as a departure from the spirit and scope of the invention, but all such modifications shall be intended to be within the scope of the following claims.

What is claimed is:

1. A ghost cancelling reference signal transmission/-reception system comprising:

a means for generating a digital signal composed of frame synchronizing signals, clock synchronizing signals, and data signals;

a means for superposing said digital signal on a television signal in a vertical blanking interval of the television signal;

a transmission means for transmitting said television signal containing said superposed digital signal; and a ghost cancelling means that receives the transmitted television signal and executes a correlative operation of the transmitted television signal to eliminate group-delay distortion, frequency-amplitude characteristic distortion and ghost generated in said transmission means from the transmitted television signal, said ghost cancelling means using said digital signal superposed on said television signal as a reference signal.

2. A ghost cancelling reference signal transmission/-reception system comprising:

a means for generating a digital signal;

a means for superposing said digital signal on a television signal in a vertical blanking interval of the television signal;

a transmission means for transmitting said television signal containing said superposed digital signal; and a ghost cancelling means that receives the transmitted television signal and executes a correlative operation of the transmitted television signal to eliminate group-delay distortion, frequency-amplitude characteristic distortion and ghost generated in said transmission means from the transmitted television signal, said ghost cancelling means using said digital signal superposed on said television signal as a reference signal; wherein a transmission bit rate of said digital signal is at least twice the video band of the television signal.

3. A ghost cancelled reference signal transmission/-reception system comprising:

a means for generating a digital signal;

a means for superposing said digital signal on a television signal in a vertical blanking interval of the television signal;

a transmission means for transmitting said television signal containing said superposed digital signal; and a ghost cancelling means that receives the transmitted television signal and executes a correlative operation of the transmitted television signal to eliminate group-delay distortion, frequency-amplitude characteristic distortion and ghost generated in said transmission means from the transmitted television signal, said ghost cancelling means using said digital signal superposed on said television signal as a reference signal; wherein a transmission bit rate of said digital signal is at least twice the color subcarrier frequency of the television signal.

4. A ghost cancelling reference signal transmission/-reception system comprising:

a means for generating a digital signal;

a means for superposing said digital signal on a television signal in a vertical blanking interval of the television signal;

a transmission mean for transmitting said television signal containing said superposed digital signal; and a ghost cancelling means that receives the transmitted television signal and executes a correlative operation of the transmitted television signal to eliminate group-delay distortion, frequency-amplitude characteristic distortion and ghost generated in said transmission means from the transmitted television signal, said ghost cancelling means using said digital superposed on said television signal as a reference signal; wherein said digital signal is composed of first and second digital signals which are superposed on the television signal in each horizontal period in the vertical blanking period except periods containing vertical equalizing pulses and vertical sync pulses.

5. A ghost cancelling reference signal transmission/-reception system comprising:

a means for generating a digital signal composed of a first signal which is an arbitrary digital signal and a second signal which is a fixed signal which will become a bar signal when modulated for transmission;

a means for superposing said digital signal on a television signal in a vertical blanking interval of the television signal;

a transmission means for transmitting said television signal containing said superposed digital signal; and a ghost cancelling means that receives the transmitted television signal and executes a correlative operation of the transmitted television signal to eliminate group-delay distortion, frequency-amplitude characteristic distortion and ghost generated in said transmission means from the transmitted television signal, said ghost cancelling means using said digital signal superposed on said television signal as a reference signal.

6. A ghost cancelling reference signal transmission/-reception system comprising:

a means for generating a digital signal;

a means for superposing said digital signal on a television signal in a vertical blanking interval of the television signal;

a transmission means for transmitting said television signal containing said superposing digital signal; and a ghost cancelling means that receives the transmitted television signal and executes a correlative operation of the transmitted television signal to eliminate group-delay distortion, frequency-amplitude characteristic distortion and ghost generated in said transmission means from the transmitted television signal, said ghost cancelling means using said digital signal superposed on said television signal as a reference signal;

a delay means for delaying an input television signal;

a waveform equalizing means for equalizing the waveform of the delayed television signal;

a memory means for storing the input and output signals of said waveform equalizing means; and a means for controlling said delay means, waveform equalizing means and memory means.

* * * * *